United States Patent
Tooley et al.

(10) Patent No.: US 10,208,786 B2
(45) Date of Patent: Feb. 19, 2019

(54) MOUNTING

(75) Inventors: Jonathan H. Tooley, Andover (GB); Peter J. Pegden, Sutton Park Hull (GB)

(73) Assignee: Croydex Limited, Andover (GB)

( * ) Notice: Subject to any disclaimer, the term of this patent is extended or adjusted under 35 U.S.C. 154(b) by 0 days.

(21) Appl. No.: 14/002,974

(22) PCT Filed: Feb. 10, 2012

(86) PCT No.: PCT/GB2012/050307
§ 371 (c)(1),
(2), (4) Date: Dec. 11, 2013

(87) PCT Pub. No.: WO2012/120268
PCT Pub. Date: Sep. 13, 2012

(65) Prior Publication Data
US 2014/0084118 A1 Mar. 27, 2014

(30) Foreign Application Priority Data
Mar. 4, 2011 (GB) .................................. 1103778.5

(51) Int. Cl.
*F16B 47/00* (2006.01)
*A47K 10/10* (2006.01)
(Continued)

(52) U.S. Cl.
CPC .............. *F16B 47/00* (2013.01); *A47K 10/10* (2013.01); *F16B 11/00* (2013.01); *F16B 47/003* (2013.01);
(Continued)

(58) Field of Classification Search
CPC ...... F16B 47/00; F16B 47/003; F16B 47/006; F16B 11/00; F16B 5/0664; A47G 1/17;
(Continued)

(56) References Cited

U.S. PATENT DOCUMENTS

| | | | | |
|---|---|---|---|---|
| 1,966,427 A | * | 7/1934 | Berge | ...................... F16B 39/24 411/148 |
| 2,370,938 A | * | 3/1945 | Cohen | .................. B65G 49/061 248/205.8 |

(Continued)

FOREIGN PATENT DOCUMENTS

| DE | 10 2007 057 889 A1 | 6/2009 |
|---|---|---|
| EP | 0 775 462 A2 | 5/1997 |
| GB | 2 426 784 A | 12/2006 |

*Primary Examiner* — Christopher Garft
(74) *Attorney, Agent, or Firm* — Blank Rome LLP

(57) ABSTRACT

The present invention provides a mounting for attachment to a substantially vertical surface, comprising a fixing member (1), having an adhesive layer (4) for contacting and bonding to a surface, a rotatable member (10) comprising a substantially helical or wedge shaped surface (22) engaged with a corresponding substantially helical or wedge shape surface (2) of the fixing member (1), and an intermediate member (5), gripped between the rotatable member (10) and the fixing member (1), in use, wherein the intermediate member (5) has a formation (15) for pressing the fixing member (1) at a position (3) within the outer periphery (23) of the fixing member, so that the fixing member (1) and adhesive layer (4) are not deformed excessively. A stop (25) in the form of a helical spring may be provided for limiting the movement of the fixing member (1) with respect to the rotatable member (10) so that the fixing member is substantially not deformed by the movement of the fixing member with respect to the rotatable member. The periphery (24) of the intermediate member may extend outside the periphery of the adhesive layer (4) in a plane parallel to the surface, in use, to protect it.

38 Claims, 3 Drawing Sheets

(51) Int. Cl.
*F16B 11/00* (2006.01)
*F16B 5/06* (2006.01)

(52) U.S. Cl.
CPC ......... *A47K 2201/02* (2013.01); *F16B 5/0664* (2013.01)

(58) Field of Classification Search
CPC .............. B60R 2011/007; A47K 10/10; A47K 2201/02
USPC ................ 248/205.5, 682, 537, 205.7, 205.8
See application file for complete search history.

(56) References Cited

U.S. PATENT DOCUMENTS

| | | | | |
|---|---|---|---|---|
| 4,133,575 A | * | 1/1979 | Mader | B60J 1/20 248/205.8 |
| 4,433,930 A | | 2/1984 | Cosenza | |
| 5,349,834 A | * | 9/1994 | Davidge | E05B 15/1607 156/306.6 |
| 6,308,923 B1 | * | 10/2001 | Howard | F16B 47/00 248/205.5 |
| 6,349,445 B1 | * | 2/2002 | Mackay | A46B 5/00 15/143.1 |
| 6,478,271 B1 | * | 11/2002 | Mulholland | F16B 47/00 248/205.8 |
| 7,628,362 B2 | | 12/2009 | Song | |
| 2002/0113181 A1 | * | 8/2002 | Zou | F16B 47/00 248/205.5 |
| 2003/0056882 A1 | * | 3/2003 | Cyr | B65H 19/102 156/157 |
| 2004/0206867 A1 | * | 10/2004 | Zhadanov | A47K 5/04 248/206.3 |
| 2008/0197246 A1 | * | 8/2008 | Belden | A47F 13/00 248/176.1 |
| 2008/0224009 A1 | | 9/2008 | Song | |
| 2009/0166497 A1 | * | 7/2009 | Carnevali | B60R 11/02 248/309.4 |
| 2009/0206215 A1 | * | 8/2009 | Tooley | A47K 5/18 248/205.8 |
| 2011/0084038 A1 | * | 4/2011 | Zack | A47K 3/001 211/85.7 |
| 2011/0226922 A1 | * | 9/2011 | Ishizaki | F16B 47/006 248/363 |

* cited by examiner

MOUNTING

The present invention relates to a mounting for attachment to a substantially vertical surface. It is particularly suitable for mounting other objects, for example domestic fittings and furnishings, to vertical surfaces. There has been much interest recently in systems which allow objects to be mounted to walls, without screwing into the wall.

For example, it is known to use suction mountings (for example as shown in GB 2426784), in which a suction pad is drawn away from the wall to create a partial vacuum which fixes the mounting to the wall. Alternatively, adhesive can be used, for example as disclosed in WO 03/036106.

Typically, there are two components to any such mounting. The first component is the part which allows the mounting to be fixed to the wall (by suction or adhesive, for example). The second component allows another object to be fixed to the mounting.

One widely used system for fixing an object such as a structural member to the mounting involves the use of a rotatable member and an intermediate member, the rotatable member being rotated to retain or grip a part of the structural member on the intermediate member.

Such arrangements are widely used in such mountings, for example as shown in GB 2426784.

There is a need to provide an intermediate member for such a mounting which can be selectively used with a suction fixing or with adhesive fixing. This can simplify the inventory of manufacturers or it can be supplied in the form of a kit, so that the user can select the appropriate form of fixing. The present inventor has realised, however, that the way in which a suction mounting works is significantly different to the way in which adhesive works.

In a suction mounting, it is desirable to press down the edges of a suction pad and to draw the centre of the suction pad away from the wall, to create the partial vacuum which fixes the suction mounting to the wall. The pattern of forces to be exerted on the suction member involves pressing down at the edges and pulling away in the middle. In contrast, an adhesive layer works best when the load is evenly distributed across the adhesive layer. This is because, if one part of the adhesive layer receives more tension than another, there is a tendency for that part to debond prematurely, which can lead to failure of the entire bonded surface.

The inventor has accordingly realised that the conventional arrangement of an intermediate member used for a suction mounting, in which the suction mounting is designed to press the edge of the suction member only, has certain disadvantages if it is used in conjunction with an adhesive layer. The inventor has realised that these can be overcome by providing a formation for pressing the fixing member at a position within the outer periphery of the fixing member.

Accordingly, in a first aspect, the present invention provides a mounting for attachment to a substantially vertical surface, comprising:
 a fixing member, having an adhesive layer for contacting and bonding to a surface,
 a rotatable member comprising a substantially helical or wedge shaped surface engaged with a corresponding substantially helical or wedge shape surface of the fixing member, and
 an intermediate member, gripped between the rotatable member and the fixing member, in use,
wherein the intermediate member has a formation for pressing the fixing member at a position within the outer periphery of the fixing member.

The present inventor has further realised that there is a tendency, with a screw or other helical type connection between a rotatable member and an intermediate member, to apply too much tension to the fixing member, by tightening the rotatable member too much. Whilst this is beneficial in suction mountings, as it increases the degree of suction, it can be a disadvantage with an adhesive mounting, as it can cause the part of the adhesive layer adjacent to the respective helical surface to be overloaded and to debond prematurely.

The present inventor has realised that a stop may be provided for limiting the movement of the intermediate member with respect to the rotatable member so that deformation of the fixing member is prevented or limited.

Accordingly, in a second aspect, the present invention provides a mounting for attachment to a substantially vertical surface, comprising:
 a fixing member, having an adhesive layer for contacting and bonding to a surface,
 a rotatable member comprising a substantially helical or wedge shaped surface engaged with a corresponding substantially helical or wedge shape surface of the fixing member, and
 an intermediate member, gripped between the rotatable member and the fixing member, in use,
wherein a stop is provided for limiting the movement of the fixing member with respect to the rotatable member so that the fixing member is substantially not deformed by the movement of the fixing member with respect to the rotatable member.

The inventor has further realised that the adhesive layer can be vulnerable to damage, in use, as it may be made of a relatively soft material. To prevent accidental damage, for example when cleaning a wall, the present inventor has realised that the intermediate member can extend beyond the periphery of the adhesive layer, to protect it.

Accordingly, in a third aspect, the present invention provides a mounting for attachment to a substantially vertical surface, comprising:
 a fixing member, having an adhesive layer for contacting and bonding to a surface,
 a rotatable member comprising a substantially helical or wedge shaped surface engaged with a corresponding substantially helical or wedge shape surface of the fixing member, and
 an intermediate member, gripped between the rotatable member and the fixing member, in use,
wherein the periphery of the intermediate member extends outside the periphery of the adhesive layer in a plane parallel to the surface, in use.

In the present invention, the features of any of the first, second and third aspects may be combined with one another.

Preferred and optional features of the invention will be described further below.

Unless otherwise specified, the comments below apply to all of the first, second and third aspects of the invention.

First Aspect

In the first aspect of the invention, the intermediate member has a formation for pressing the fixing member at a position within the outer periphery of the fixing member.

That is, when the fixing member is viewed in a plane which is parallel in use to the surface to which the mounting is to be fixed, there will be at least one position within the outer periphery of the fixing member in this plane at which it is pressed by the intermediate member. The position may be of any suitable configuration. Preferably, the formation of the intermediate member is configured to press the fixing member in a zone, for example a zone defining a line. The zone may comprise a continuous line which is displaced over at least part of its length, and preferably the whole of its length, from the outer periphery of the fixing member. The position or zone is preferably displaced (at at least one part, preferably over at least 50% of its extent, and most preferably over all of its extent) from the outer periphery of the fixing member by a distance which is equal to at least 10% of the maximum width of a shape defined by the periphery of the fixing member in the plane. Preferably, the position is displaced by at least 15% of the maximum width.

For example, the intermediate member and/or the fixing member may be circular in plan and the position may comprise a circular or elliptical region displaced from the outer periphery of the fixing member by at least 10% of the diameter of the fixing member. The intermediate member may comprise a formation for pressing the fixing member in a region which extends continuously from the outer periphery of the fixing member to a position which is within the outer periphery of the fixing member.

Alternatively, the intermediate member may comprise only a formation for pressing the fixing member at a position which is within the outer periphery of the fixing member or a first formation for pressing the fixing member substantially at a position which is at the outer periphery of the fixing member and a second formation for pressing the fixing member at a position within the outer periphery of the fixing member.

The position which is at the outer periphery of the fixing member position or zone is preferably displaced (at at least one part, preferably over at least 50% of its extent, and most preferably over all of its extent) from the outer periphery of the fixing member by a distance which is not more than 10% (preferably not more than 5%) of the maximum width of a shape defined by the periphery of the fixing member in the plane.

There may preferably be a third or more formations for pressing the fixing member at other positions. Preferably, at a position of the fixing member adjacent to the helical or wedge shaped surfaced of the fixing member, there is no formation for pressing the fixing member which is integral with the intermediate member. In this way, the intermediate member can be reused (as will be explained further below) in conjunction with a suction member.

In this case, the part where the intermediate member does not press the fixing member allows the suction member to be drawn upwards by engagement of the helical surfaces, creating the necessary suction.

Preferably, the position is greater than 40%, more preferably greater than 35% of the maximum width, from the outer periphery.

However, as removable stop may be used, as described below in relation to the second aspect.

Preferably, the fixing member comprises a fixing surface for contacting the surface to which the mounting is to be attached, the fixing surface comprising the adhesive layer. The fixing surface is preferably planar and most preferably flat planar.

Preferably, the intermediate member has a first formation for pressing the fixing member at a position at the outer periphery of the fixing member and a second formation for pressing the fixing member at a position within the outer periphery of the fixing member, the second formation extending further towards the fixing member than the first formation. In this way, as the rotatable member is used to apply pressure to the intermediate member and the fixing member, the first part of the intermediate member to press the fixing member is the second formation. This is found to give particularly good balance of pressure distribution across the fixing member. The tendency of the pressing to deform the fixing member adjacent the substantially helical or wedge shaped surface is compensated for by the slight forward projection of the second formation.

Preferably, the second formation extends beyond the first formation by a distance which is no more than 5 mm, preferably no more than 2 mm, and most preferably no more than 1 mm.

In case the adhesive layer extends beyond the periphery of fixing structure to which it is attached, the maximum width in the plane parallel to the surface to which the mounting is to be attached is preferably taken with respect to a fixing structure to which the adhesive layer is fixed, as the fixing structure will typically be significantly stiffer.

Preferably, if the notional positions of the first formation and the second formation for simultaneous contact with the fixing member are considered, the second formation preferably extends by a distance of at least 0.1 mm, preferably less than 2 mm and more preferably at least 0.2 mm, more preferably less than 1 mm beyond its notional position for simultaneous contact.

Second Aspect

The stop for preventing deformation of the fixing member may comprise any suitable formation. For example, it may comprise a surface which is configured to abut a part of the intermediate member when the movement of the fixing member has reached a certain amount. For example, the intermediate member preferably comprises, in the second aspect of the invention, at least one part for pressing the fixing member at a position separate from a part corresponding to the substantially helical or wedge shaped surface of the fixing member. The stop member of the second aspect of the invention may be configured so that, when the rotatable member is rotatably engaged with the fixing member, the movement of the part of the fixing member having the substantially helical or wedge shaped surface compared to a part of the fixing member pressed by the intermediate member is no more than 5 mm and preferably no more than 3 mm, most preferably being no more than 1 mm.

The stop member is suitably removably mounted with respect to the fixing member. In this way, the intermediate member and rotatable member can be reused with a suction member, as discussed below. The stop member may comprise a formation for surrounding the substantially helical or wedge shaped surface of the fixing member. For example, the substantially helical or wedge shaped surface of the fixing member may comprise a screw threaded surface and the stop member may comprise an annular member or bushing surrounding this. In a particularly preferred embodiment, the stop member comprises a coil spring. The coil spring has the advantage that it can keep the fixing member and the rotatable member and the intermediate member under a certain amount of tension before the rotatable member is rotated to tighten with respect to the intermediate member. This can give stability to the structure during assembly.

Third Aspect

According to the third aspect, the periphery of the intermediate member extends outside the periphery of the adhesive layer in a plane parallel to the surface, in use. The periphery of the intermediate member may comprise a radially extending flange or a radially extending skirt. It may comprise a first part, comprising a radially extending flange joining a second part, comprising an axially extending rim, the axially extending rim resting radially outside the adhesive layer, in use.

The Mounting

In all aspects the mounting of the present invention is intended suitably for mounting objects to walls, the objects being for example structures or items commonly used in domestic situations, such a kitchens and bathrooms. For example, the mounting may be used to mount a mirror, cabinet, shelf, or a structure such as a toilet roll holder, towel holder, wire basket, etc to a wall.

The mounting may be used for attachment to many different types of surface, for example surfaces formed of glass, metal, such as stainless steel, tile, plaster, wood or synthetic materials. It is found that the adhesive member can be used to engage a wider range of surfaces than suction members, being particularly suitable for engaging plaster and painted surfaces.

The mounting of the present invention may be provided as part of a kit which comprises the mounting and at least one structure which is engageable with the mounting.

For example, the structure may be engaged by the mounting by engagement of the rotatable member with the intermediate member.

The mounting may also be provided as part of a kit which includes not only the fixing member of the invention, but also a suction member which can be used in place of the fixing member, where this is desired by the user.

The mounting may be provided for removable attachment to a surface. For example, the mounting may be configured so that it will not be removed from the surface by the weight of the object or structure which it is intended to support, but may be removed under other circumstances. For example, it may be removed by application of greater force than the normal load due to the object. It may be removed by a twisting action which is different to that normally applied by the object.

The adhesive layer may comprise a double-sided foam based adhesive, as described further below, which can be debonded by pulling in a direction parallel to the surface.

Fixing Member

The fixing member suitably has a substantially flat base. Preferably, it is substantially circular in plan.

The adhesive layer preferably comprises a contact surface which is parallel in use to the surface to which the mounting is to be fixed. In practice, references herein to the plane of the surface to which the mounting is to be fixed may equally refer to the contact surface.

The fixing member may be formed of any suitable material, for example metal or synthetic material, for example thermoplastic or other synthetic polymeric material.

The fixing member may comprise a fixing structure and an adhesive layer bonded thereto. As will be further described below, the fixing structure may also be engaged with a screw threaded member which defines the substantially helical or wedge shaped surface of the fixing member.

The adhesive layer may be applied by the user during attachment of the mounting to a wall. However, preferably, the adhesive layer is preformed on the fixing member as it is supplied to the user. The adhesive layer may comprise a removable protective film which is removed by a user when it is desired to attach the fixing member to a wall. The adhesive layer suitably comprises a layer which is coated with adhesive on two sides. One side of the adhesive adheres the film to a fixing structure and the other is for adhering to a wall.

The second adhesive surface is suitably protected by a removable protective layer.

It is particularly preferred that the adhesive layer comprises a double-sided adhesive foam bonding tape material, for example double coated urethane foam tape material. These materials have the advantage that they can be released by pulling the foam material in a direction which is parallel to the surface to which they are attached, whereby a smooth, progressive debonding from the surface can be obtained under controlled conditions as required by the user.

The substantially helical or wedge shaped surface of the fixing member suitably comprises a screw threaded projection. Preferably, it is an externally screw threaded projection.

The substantially helical or wedge shaped surface of the fixing member may be integrally formed with the fixing member, for example by moulding. However, it preferably comprises a screw threaded member which is engaged with a fixing structure of the fixing member.

For example, it may be engaged in a hole of the fixing structure. The screw threaded member may be fixed in position by its engagement with the rotatable member.

For example, the screw threaded member may comprise a screw or bolt. Suitably, the screw or bolt has a head and a shank, the shank projecting through a hole in the fixing structure to define the screw threaded surface and the head holding the screw or bolt in the fixing structure. The head may be received in a recess formed in a surface of the fixing structure adjacent the adhesive layer. A space may be formed in the adhesive layer at a position corresponding to the recess, so that the fixing member can be quickly and efficiently assembled in use.

Preferably, the head of the screw threaded member has a non-circular plan (for example comprising at least one flat) and is received in a recess of the fixing structure which has a corresponding non-circular plan. This allows the screw threaded member to be retained in a non-rotatable fashion with respect to the fixing structure.

A surface of the fixing member opposite to the surface having the adhesive layer may comprise any suitable profile. Preferably, it comprises at least one formation for engaging the formation of the intermediate member. It may comprise, for example, at least one ridge or surface against which at least one formation of the intermediate member may engage, so that the fixing member can be securely held with respect to the intermediate member. The surface of the fixing member where it is engaged by the formation of the intermediate member is suitably generally parallel to the surface to which the mounting is fixed, in use. Suitably, the fixing member has, when viewed in cross-section, a stepped profile which is thickest at the centre, the substantially helical or wedge shaped surface being formed at or adjacent to the centre.

Rotatable Member

The rotatable member may have any suitable shape. For example, it preferably comprises a circular plan. It may be made of any suitable material, for example metal or synthetic material such as synthetic thermoplastic material.

The rotatable member may be designed so that it extends beyond a part of the intermediate member which is adjacent to the rotatable member in use. In this way, it is easy for a user to grip the rotatable member and rotate it without fingers catching on the intermediate member. At the same time, the rotatable member can be given a relatively flat profile.

The rotatable member preferably extends beyond the part of the intermediate member adjacent to the rotatable member in a plane substantially parallel to the surface to which the mounting can be attached.

The substantially helical or wedge shaped surface of the rotatable member may have any suitable form. Preferably, it is an internal thread for engaging an externally threaded member of the fixing member.

Intermediate Member

The intermediate member is provided so that, in use, it is gripped between the rotatable member and the fixing member. That is, rotatable engagement of the substantially helical or wedge shaped surface of the rotatable member with the corresponding substantially helical or wedge shaped surface of the fixing member draws the rotatable member and the fixing member towards one another. When the mounting is assembled the intermediate member is suitably placed between the rotatable member and the fixing member so that it is gripped between them due to the movement of the fixing member and rotatable member towards one another. A part of the rotatable member may press on the intermediate member and the intermediate member will press on the fixing member. Suitably, at least one of the rotatable member and the intermediate member, and preferably both of them together, provide a means for supporting an object or structure.

In one embodiment, the rotatable member and the intermediate member may be configured so that part of a structure or object can be retained between them without being gripped. That is, the object or structure may be retained so that, if the object or structure is moved or struck in daily use, the force of the movement or striking is not transferred directly to the fixing member, so that accidental debonding of the fixing member can be avoided.

Alternatively, if it is desired to rigidly mount the object or structure, the rotatable member and the intermediate member may be configured so that the object or structure is gripped between them.

Suitably, the mounting of the present invention may be configured so that it forms a part of a structure for removable attachment to a surface, the structure comprising the mounting and at least one structural member, mountable on the mounting, the structural member comprising an attachment means at one end for engaging the mounting and at least one abutment displaced from the attachment, whereby, in use, the structural member can be mounted attached at the said one end via the mounting to a substantially vertical surface, with the abutment resting against the substantially vertical surface below the mounting.

In this way, a part of the force required to support the object is provided by the abutment. For example, the abutment may act as a pivot, around which the weight of the structure or object rotates away from the wall. As the abutment is displaced from the mounting, the force to be resisted at the mounting is substantially normal to the wall, rather than a twisting force. A mounting according to the present invention is well configured to resist such a force acting directly normally away from a wall, so this aspect allows the present invention to support a structural member in an optimal way.

Friction Reducing Member

Preferably, there is a friction reducing member between the rotatable member and the intermediate member. In this way, rotation of the rotatable member with respect to the intermediate member is made particularly easy, allowing for quick and effective assembly of the mounting. The friction reducing member may suitably comprise a disc or washer. The friction reducing member may be formed of any suitable material, for example metal or synthetic material, for example synthetic thermoplastic material.

Clip

The friction reducing member may be releasably fixed to one of the rotatable member and the intermediate member.

The mounting may comprise at least one clip for retaining an object or structure with respect to the rotatable member or intermediate member, during assembly.

The clip suitably comprises a resiliently deformable structure having a part for engaging the rotatable member or intermediate member and a part for engaging the part of the object or structure. This allows the object or structural member to be quickly engaged with the rotatable member or intermediate member during assembly and held stably in position while the rest of the mounting is assembled. Preferably, the clip means comprises the part of a friction reducing member. For example, the friction reducing member may comprise a friction reducing surface, at least one surface for abutting a part of an object or structure during assembly and resiliently deformable formations for engaging at least one of a rotatable member or intermediate member. Preferably, the resiliently deformable structure comprises at least one resiliently deformable hook engageable in a recess of the rotatable member or intermediate member. Preferably, it is engageable with a central hole of the intermediate member through which a screw threaded member of the fixing member projects.

The present invention will be described further below by way of example only with reference to the accompanying drawings, in which:

DETAILED DESCRIPTION OF THE DRAWINGS

Figure 1:
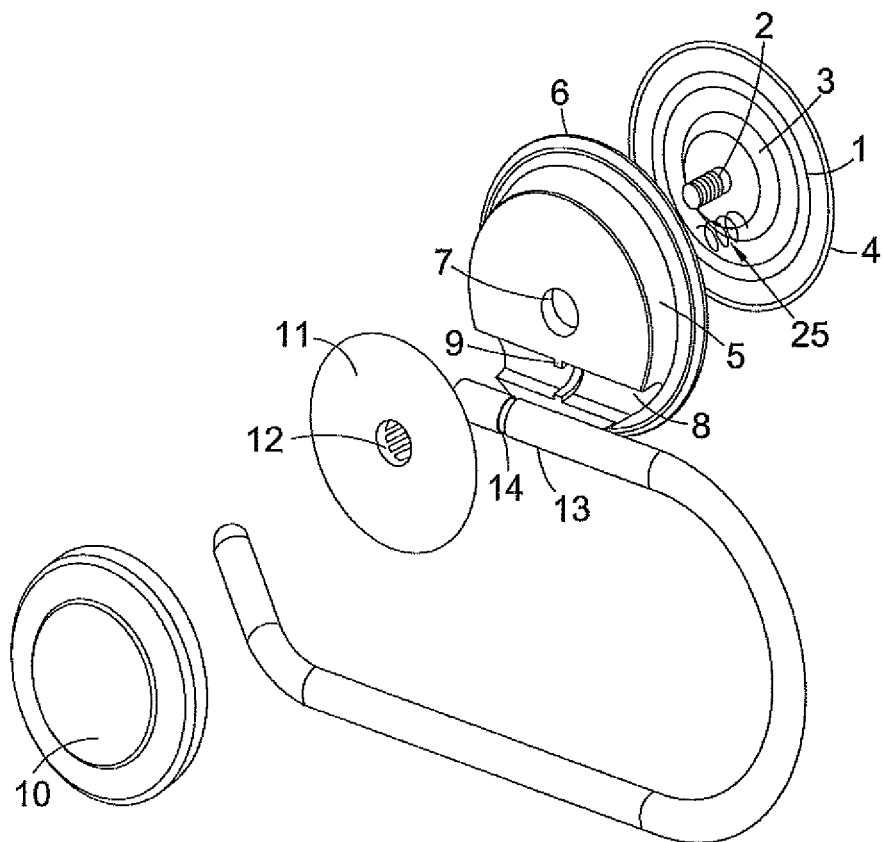
FIG. 1 is a sketch isometric view of a structure including a mounting according to all aspects of the present invention, in a disassembled state.

FIG. 1 shows a combination of a mounting according to all aspects of the invention and a structure, in this case in the form of a towel holder or toilet roll holder 13.

The mounting is provided for attachment to a substantially vertical surface, for example a tiled, plastered, painted or other wall, for example in a kitchen or bathroom, to allow the structure 13 to be mounted on the wall.

The mounting comprises a fixing member 1 which has an adhesive layer 4 for contacting and bonding to the wall surface, and which will be described further below. The mounting further comprises a rotatable member 10 and an intermediate member 5 which, when the mounting is assembled (as shown in FIG. 5) is gripped between the rotatable member 10 and the fixing member 1.

Figure 5:
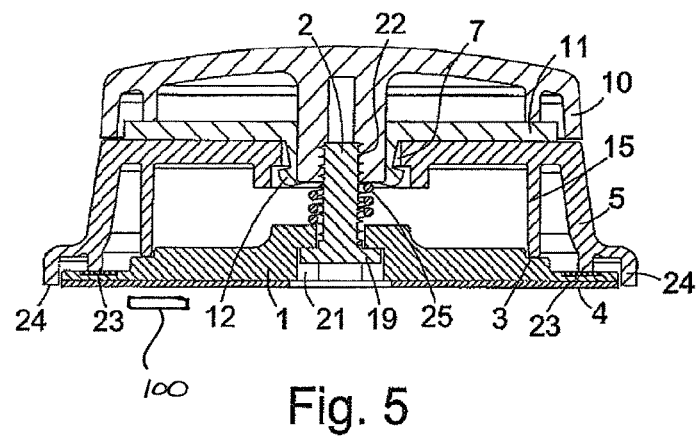
FIG. 5 is a cross-sectional view, at enlarged scale, of a mounting according to all aspects of the invention, when assembled.

The intermediate member 5 comprises, as shown in FIG. 5, a formation 15 for pressing the fixing member at a position 3 within the outer periphery of the fixing member 1.

The structure 13 is retained in a slot 8 which is formed in the intermediate member 5. The structure 13 comprises an annular recess 14 which engages with a corresponding projection 9 formed in the inner surface of the slot 8, so that when the rotatable member 10 is engaged with the intermediate member 5, the structure 13 is retained in the intermediate member in such a way that it is rotatable about a substantially horizontal axis in use, but cannot be withdrawn in the axial direction.

Figure 2:
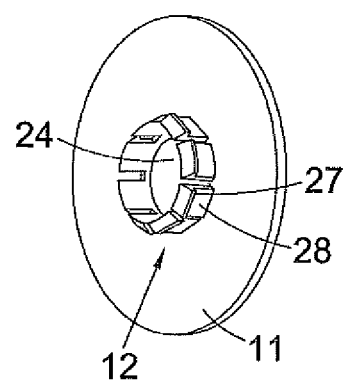
FIG. 2 is a view, at enlarged scale, of a clip used in FIG. 1.

A friction reducing member or washer 11 is provided, for reducing the friction between the rotatable member 10 and the intermediate member 5. The friction reducing member 11 comprises a disc formed of synthetic material, in this case polypropylene, and it is provided with a plurality of flexible detent members 12, as shown in FIG. 2. The flexible detent members each comprise a stem 28 and a head 27 which projects radially beyond the stem 28. The detents 12, in use, are releasably fixed inside a hole 7 of the intermediate member 5, as can be seen in FIG. 5. The heads 27 of the detents 12 grip the edges of the hole 7 so that the friction reducing member 11 is retained on the intermediate member, during assembly. The friction reducing member 11 also has the effect of acting like a clip which is releasably engageable with the intermediate member 5 in such a manner as to hold the structure 13 in position during assembly.

A coil spring 25 can be seen, whose function will be described further below with reference to FIG. 5.

Figure 3:
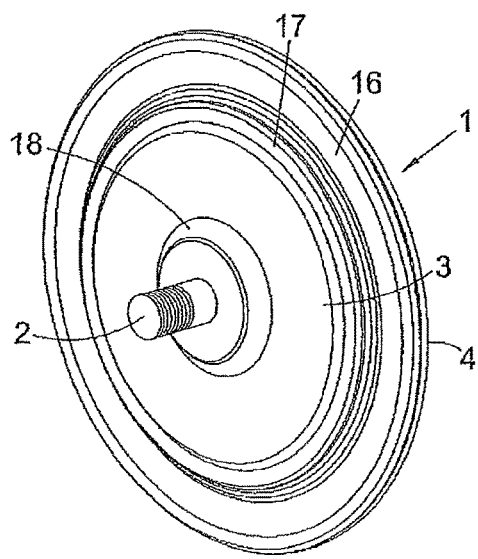
FIG. 3 is an isometric view at enlarged scale of the fixing member of FIG. 1.
Figure 4:
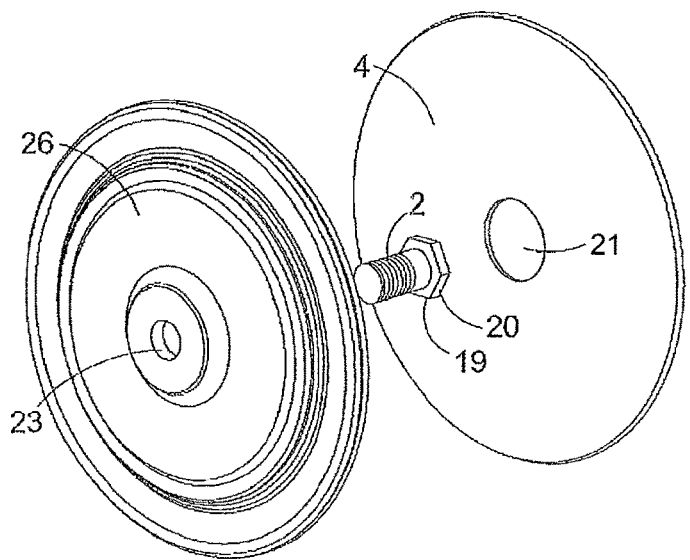
FIG. 4 is a sketch isometric view of the fixing member of FIG. 3, in a disassembled state.

The fixing member 1 is shown at enlarged scale in FIGS. 3 and 4 and comprises a fixing structure of thermoplastic material. It can be seen that the fixing structure comprises a stepped profile having an outer rim 16, a first step 17, a position 3 (comprising an annularly extending zone) on which the intermediate member 5 presses and a central boss 18 through which a screw threaded member 2 (defining a substantially helical or wedge shaped surface as required by the invention) projects.

As shown in FIG. 4, the screw threaded member 2 comprises a bolt with a screw threaded shank and a head 19 which comprises flats 20 which, as shown in FIG. 5, engage in a hole 21 with corresponding flats so that the head 19 is received in the fixing structure 1 in a non-rotatable fashion. In this way, when the screw threaded member 2 engages a corresponding screw thread 22 of the rotatable member 10 and the rotatable member 10 is rotated, the screw threaded member 2 is held in a non-rotatable manner, as explained further below. The adhesive layer 4 comprises a foam disc which is treated on both sides with an adhesive material. Preferably, the disc 4 is supplied so that it is fixed by the adhesive layer on one side to the fixing structure 26, the adhesive layer on the other side being covered with a protective, peel-off layer 100 schematically illustrated in FIG. 5. In use, the user can remove the peel-off layer 100 so that the mounting can be fixed to a selected substantially vertical surface by pressing it in contact with the surface.

The adhesive of the disc 4 may comprise any suitable contact adhesive.

A suitable adhesive material comprises double coated urethane foam tape material.

The disc 4 is configured with a central hole 21 which is large enough to allow the head 19 of the screw threaded member 2 to pass through. In this way, the mounting can be supplied in disassembled form. In use, the user can pass the shank of the screw threaded member 2 through a hole 23 in the fixing member, so that it projects, the head 19 being received in the hole 21. In this case, the adhesive layer 4 may be supplied fixed to the fixing member 1, so that the hole 21 does not impede movement of the screw threaded member 2.

FIG. 5 shows a sketch cross-sectional view of the mounting according to the present invention, in an assembled state.

It can be seen that the mounting comprises, in a direction extending away from a surface (not shown) to which the mounting is to be fixed, the adhesive layer 4, the fixing member 1, the intermediate member 5, the friction reducing member 11 and the rotatable member 10.

The rotatable member 10 comprises a member of generally circular plan, formed of injection moulded thermoplastic material. It has an internally threaded member 22 comprising a screw thread (corresponding to the substantially helical or wedge shaped surface of the rotatable member, as required by the invention) which engages the screw threaded member 2 of the fixing member 1. Relative rotation of the rotatable member 10 with respect to the threaded member 2 causes the rotatable member 10 to move in the direction towards the adhesive layer 4, as shown in FIG. 5, so that the intermediate member 5 is gripped between the rotatable member 10 and the fixing member 1. This movement allows the structure 13 shown in FIG. 1 to be securely gripped. In order to prevent excessive deformation of the fixing member 1 due to the tension on the threaded member 2 caused by rotating the rotatable member 10, the intermediate member comprises, on its inside, a formation, in this case comprising an annular skirt 15 which presses against the fixing member 1 at a position 3 which is within the outer periphery of the fixing member. It can be seen that, in this case, the position is located at a radial position which is 70% of the maximum radial extent of the fixing member 1, being displaced by 15% of the maximum radial extent of the fixing member from the adjacent periphery of the fixing member 1. In this way, a substantial part of the load due to the tightening of the rotatable member 10 against the screw threaded member is borne at the position 3. Because this position 3 is radially closer to the point at which the head 19 of the screw threaded member 2 bears against the fixing member 1, the twisting moment on the fixing member 1 is reduced, reducing the deformation.

The intermediate member 5 further comprises an annular edge 23 which engages the fixing member substantially at the outer periphery of the fixing member 4 and an outwardly directed skirt 24 which, according to the third aspect of the invention, extends beyond and protects the adhesive layer 4, when the mounting is assembled.

Preferably, when assembled, at least part of the load caused by rotation of the rotatable member with respect to the threaded member 2 is taken by annular edge 23. Preferably, however, the intermediate member is configured so that the formation 15 engages the respective part 3 of the fixing member before the annular edge 23 engages the outer periphery of the fixing member. This enhances the ability of the formation 15 to press against the fixing member at the position displaced inwardly from the periphery of the fixing member 1. For example, if the positions of the annular rim 23 and the formation 15 for simultaneous contact are considered, the formation 15 preferably extends by a distance of 1 mm beyond the notional position for simultaneous contact.

As can be further seen in FIG. 5, a coiled spring 25 is provided, which surrounds the shank of the screw threaded member 2. The coiled spring 25 is configured so that it is compressed, as the rotatable member 10 is rotated and drawn towards the fixing member 1, pushing the intermediate member 5 down. At some point in this movement, the individual coils of the coiled spring 25 touch one another and effectively prevent any further movement. In this way, the coiled spring acts as a stop for limiting the axial movement of the rotatable member 10, further limiting the amount of load which can be placed by the head 19 on the centre of the fixing member 1.

This in turn allows the configuration of the fixing member adjacent the adhesive layer to remain substantially flat. This prevents deformation of the adhesive layer.

Figure 6:
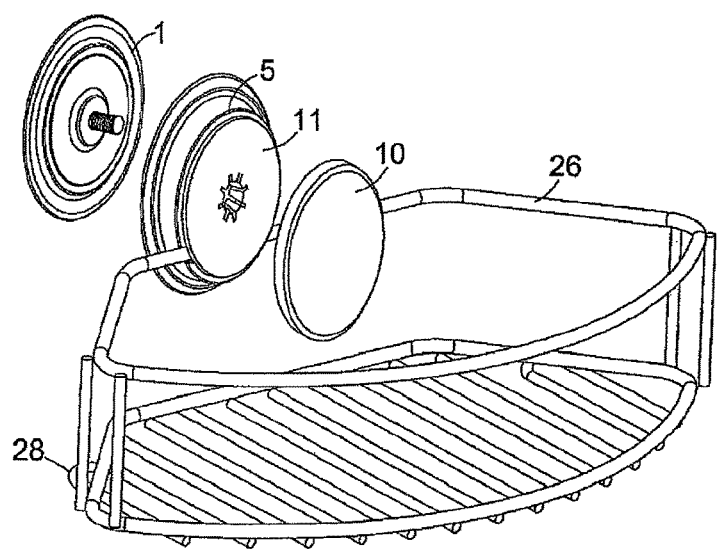
FIG. 6 is a sketch isometric view of a mounting according to the invention and a different embodiment of a structure, in a partially assembled state.

FIG. 6 shows an alternative embodiment, in which a mounting which is the same as the mounting shown in FIG. 1 is engaged with a different structure 26. The structure in this case comprises a wire basket, for example for use in a bathroom. The wire basket comprises a base 27 defined by wire segments. It also comprises at least one abutment member 28. The wire basket 26 is configured so that, when it is supported by the mounting, with the mounting engaged with a wall surface so that the wire basket extends downwardly from the mounting, the abutment member 28 rests against the substantially vertical surface below the mounting. The wire basket 26 comprises attachment means (not shown) which is received in the intermediate member 5 in a manner which is known.

In all of the embodiments described above, the intermediate member 5, the friction reducing member 11 and the rotatable member 10 may be assembled with a suction member (not shown) of the type shown in GB 2426784. Accordingly, the mounting of the present invention may form part of a kit, comprising not only the mounting of the present invention but also a suction member to be used in place of the fixing member.

Alternatively, a manufacturer's inventory may be provided comprising the components of the mounting according to the present invention and a suction member, units for sale being assembled out of the components of the present invention and the suction member, as required by the manufacturer.

The present invention has been described above purely by way of example and modifications can be made within the spirit of the invention, which extends to equivalents of the features described. The invention also consists in any individual features described or implicit herein or shown or implicit in the drawings or any combination of any such features or any generalisation of any such features or combination.

The invention claimed is:

1. A mounting for attachment to a substantially vertical surface, comprising:
    (a) a fixing member, consisting of:
        (i) a fixing structure,
        (ii) an adhesive layer bonded to a surface of the fixing structure, wherein the adhesive layer consists of a coated layer which is coated with adhesive on first and second sides, wherein the first and second sides of the coated layer face in opposite directions away from each other, wherein the adhesive that is coated on the first side of the coated layer adheres the adhesive layer to the surface of the fixing structure, and wherein the adhesive that is coated on the second side of the coated layer adheres to the surface to which the mounting is to be attached, and
        (iii) a removable protective film attached to the side of the adhesive layer for adhering to the surface to which the mounting is to be attached, for removal by a user when it is desired to attach the fixing member to the surface,
    (b) a rotatable member comprising a substantially helical surface engaged with a corresponding substantially helical shape surface of the fixing structure, and
    (c) an intermediate member, gripped between the rotatable member and the fixing member, in use,
    wherein the intermediate member has a formation for pressing the fixing member at a position within the outer periphery of the fixing member, and wherein the surface of the fixing structure which is bonded to the adhesive layer is flat and planar in use to prevent deformation of the adhesive layer, and
    wherein the intermediate member has a first formation for pressing the fixing member at a position at the outer periphery of the fixing member and a second formation for pressing the fixing member at a position within the outer periphery of the fixing member, the second formation extending further towards the fixing member than the first formation.

2. A mounting according to claim 1, wherein the formation of the intermediate member is configured to press the fixing member in a zone comprising a continuous line which is displaced over at least part of its length from the outer periphery of the fixing member.

3. A mounting according to claim 2, wherein the position or zone is displaced from the outer periphery of the fixing member by a distance which is equal to at least 10% of the maximum width of the fixing member in a plane which is parallel in use to the surface to which the mounting is to be fixed.

4. A mounting according to claim 1, wherein the position is greater than 40% of the maximum width, of the fixing member in a plane which is parallel in use to the surface to which the mounting is to be fixed, from the outer periphery.

5. A mounting according to claim 1, wherein, at a position of the fixing member adjacent to the substantially helical shape surface of the fixing structure, there is no formation for pressing the fixing member.

6. A mounting according to claim 1, wherein the side of the adhesive layer for adhering to the surface to which the mounting is to be attached is planar.

7. A mounting according to claim 1, wherein the side of the adhesive layer for adhering to the surface to which the mounting is to be attached is flat and planar.

8. A mounting according to claim 1, wherein, when the first formation and the second formation are positioned for simultaneous contact with the fixing member, the second formation extends by a distance of at least 0.1 mm and less than 2 mm beyond its position for simultaneous contact.

9. A mounting according to claim 1, wherein, when the first formation and the second formation are positioned for simultaneous contact with the fixing member, the second formation extends by a distance of at least 0.2 mm, and less than 1 mm beyond its position for simultaneous contact.

10. A mounting according to claim 1, wherein a periphery of the intermediate member extends outside a periphery of the adhesive layer in a plane parallel to the surface, in use.

11. A mounting according to claim 10, wherein the periphery of the intermediate member comprises a radially extending flange or a radially extending skirt.

12. A mounting according to claim 10, wherein the periphery of the intermediate member comprises a first part, comprising a radially extending flange joining a second part, comprising an axially extending rim, the axially extending rim resting radially outside the adhesive layer, in use.

13. A mounting according to claim 10, wherein the formation of the intermediate member is configured to press the fixing member in a zone comprising a continuous line which is displaced over at least part of its length from the outer periphery of the fixing member.

14. A mounting according to claim 1, wherein the substantially helical shape surface of the fixing structure comprises a screw threaded member.

15. A mounting according to claim 14, wherein the screw threaded member comprises a screw or bolt having a head and a shank, the shank projecting through a hole in the fixing structure to define screw threaded surface and the head holding the screw or bolt in the fixing structure.

16. A mounting according to claim 15, wherein the head of the screw threaded member has a non-circular plan and is received in a recess of the fixing structure which has a corresponding non-circular plan.

17. A mounting according to claim 1, wherein the rotatable member extends beyond a part of the intermediate member which is adjacent to the rotatable member in use.

18. A mounting according to claim 1, wherein at least one of the rotatable member and the intermediate member, and preferably both of them together, provide support for an object or structure.

19. A mounting according to claim 18, wherein the rotatable member and the intermediate member are configured so that part of the structure or object can be retained loosely between them.

20. A mounting according to claim 1, wherein there is a friction reducing member between the rotatable member and the intermediate member.

21. A mounting according to claim 1, wherein there is at least one clip for retaining an object or structure with respect to the rotatable member or intermediate member, during assembly.

22. A kit comprising the mounting of claim 1, and at least one structure which is engageable with the mounting.

23. A kit according to claim 22, wherein the structure is engaged by the mounting by engagement of the rotatable member with the intermediate member.

24. A kit comprising the mounting of claim 1 and a suction member which can be used in place of the fixing member.

25. A structure for removable attachment to a surface, the structure comprising a mounting according to claim 1 and at least one structural member, mountable on the mounting, the structural member comprising an attachment at one end for engaging the mounting and at least one abutment displaced from the attachment, whereby, in use, the structural member can be mounted attached at the said one end via the mounting to a substantially vertical surface, with the abutment resting against the substantially vertical surface below the mounting.

26. A mounting according to claim 1, wherein the configuration of the fixing member adjacent the adhesive layer is substantially flat in use, over substantially the entire extent of the adhesive layer to prevent deformation of the adhesive layer.

27. A mounting for attachment to a substantially vertical surface, comprising:
(a) a fixing member, comprising:
  (i) a fixing structure,
  (ii) an adhesive layer bonded to a surface of the fixing; structure, wherein the adhesive layer consists of a coated layer which is coated with adhesive on first and second sides, wherein the first and second sides of the coated layer face in opposite directions away from each other, wherein the adhesive that is coated on the first side of the coated layer adheres the adhesive layer to the surface of the fixing structure, and wherein the adhesive that is coated on the second side of the coated layer adheres to the surface to which the mounting is to be attached, and
  (iii) a removable protective film attached to the side of the adhesive layer for adhering to the surface to which the mounting is to be attached, for removal by a user when it is desired to attach the fixing member to the surface,
(b) a rotatable member comprising a substantially helical surface engaged with a corresponding substantially helical shape surface of the fixing structure, and
(c) an intermediate member, gripped between the rotatable member and the fixing member, in use,
wherein the intermediate member has a formation for pressing the fixing member at a position within the outer periphery of the fixing member, and wherein the surface of the fixing structure which is bonded to the adhesive layer is flat and planar in use to prevent deformation of the adhesive layer, and
wherein a stop member is provided for limiting the movement of the fixing member with respect to the rotatable member, and wherein the fixing member is substantially not deformed by the movement of the fixing member with respect to the rotatable member, and
wherein the stop member comprises a coil spring.

28. A mounting according to claim 27, wherein the stop member is configured so that, when the rotatable member is rotatably engaged with the fixing member, the movement of the part of the fixing structure having the substantially helical shape surface compared to a part of the fixing member pressed by the intermediate member is no more than 5 mm.

29. A mounting according to claim 27, wherein the stop member is removably mounted with respect to the fixing member.

30. A mounting according to claim 27, wherein the stop member comprises a formation for surrounding the substantially helical shape surface of the fixing structure.

31. A mounting according to claim 30, wherein the substantially helical shape surface of the fixing structure comprises a screw threaded surface and the stop member comprises an annular member or bushing surrounding the screw threaded surface.

32. A mounting according to claim 27, wherein the formation of the intermediate member is configured to press the fixing member in a zone comprising a continuous line which is displaced over at least part of its length from the outer periphery of the fixing member.

33. A mounting for attachment to a substantially vertical surface, comprising:
(a) a fixing member, consisting of:
  (i) a fixing structure,
  (ii) an adhesive layer bonded to a surface of the fixing structure, wherein the adhesive layer consists of a coated layer which is coated with adhesive on first and second sides, wherein the first and second sides of the coated layer face in opposite directions away from each other, wherein the adhesive that is coated on the first side of the coated layer adheres the adhesive layer to the surface of the fixing structure, and wherein the adhesive that is coated on the second side of the coated layer adheres to the surface to which the mounting is to be attached, and
  (iii) a removable protective film attached to the side of the adhesive layer for adhering to the surface to which the mounting is to be attached, for removal by a user when it is desired to attach the fixing member to the surface,
(b) a rotatable member comprising a substantially helical surface engaged with a corresponding substantially helical shape surface of the fixing structure, and
(c) an intermediate member, gripped between the rotatable member and the fixing member, in use, wherein a stop member is provided for limiting the movement of the fixing member with respect to the rotatable member, and wherein the fixing member is substantially not deformed by the movement of the fixing member with respect to the rotatable member, and wherein the surface of the fixing structure which is bonded to the adhesive layer is flat and planar in use to prevent deformation of the adhesive layer, and wherein the stop member comprises a coil spring.

34. A mounting according to claim 33, wherein the stop member is configured so that, when the rotatable member is rotatably engaged with the fixing member, the movement of the part of the fixing structure having the substantially helical shape surface compared to a part of the fixing member pressed by the intermediate member is no more than 5 mm.

35. A mounting according to claim 33, wherein the stop member is removably mounted with respect to the fixing member.

36. A mounting according to claim 33, wherein the stop member comprises a formation for surrounding the substantially helical shape surface of the fixing structure.

37. A mounting according to claim 36, wherein the fixing structure includes a screw threaded surface, and the stop member comprises an annular member or bushing surrounding the screw threaded surface.

38. A mounting according to claim 33, wherein the configuration of the fixing member adjacent the adhesive layer is substantially flat in use, over substantially the entire extent of the adhesive layer to prevent deformation of the adhesive layer.

\* \* \* \* \*